United States Patent
Kang et al.

(10) Patent No.: US 6,849,969 B2
(45) Date of Patent: Feb. 1, 2005

(54) TRANSVERSE FLUX LINEAR MOTOR WITH PERMANENT MAGNET EXCITATION

(75) Inventors: Do Hyun Kang, Changwon-si (KR); Jeong Woo Jeon, Changwon-si (KR)

(73) Assignee: Korea Electrotechnology Research Institute, Kyungsangnam-do (KR)

( * ) Notice: Subject to any disclaimer, the term of this patent is extended or adjusted under 35 U.S.C. 154(b) by 78 days.

(21) Appl. No.: 10/327,856

(22) Filed: Dec. 26, 2002

(65) Prior Publication Data

US 2003/0127917 A1 Jul. 10, 2003

(30) Foreign Application Priority Data

Dec. 26, 2001 (KR) .................................. 10-2001-0085159

(51) Int. Cl.[7] .............................................. H02K 41/00
(52) U.S. Cl. ......................................... 310/12; 310/254
(58) Field of Search .......................... 310/12, 216, 254, 310/255, 259

(56) References Cited

U.S. PATENT DOCUMENTS

| | | | | |
|---|---|---|---|---|
| 4,908,533 A | * | 3/1990 | Karita et al. .................. | 310/12 |
| 5,208,498 A | * | 5/1993 | Hamajima .................... | 310/12 |
| 5,602,431 A | * | 2/1997 | Satomi et al. ................ | 310/14 |
| 5,734,209 A | * | 3/1998 | Hallidy ........................ | 310/12 |
| 6,069,418 A | * | 5/2000 | Tanaka ........................ | 310/12 |
| 6,274,952 B1 | * | 8/2001 | Chitayat ...................... | 310/12 |
| 6,703,806 B2 | * | 3/2004 | Joong et al. ................. | 318/649 |

* cited by examiner

Primary Examiner—Tran Nguyen
Assistant Examiner—J. Aguirrechea
(74) Attorney, Agent, or Firm—Piper Rudnick LLP (57) ABSTRACT

A transverse flux linear motor with permanent magnet excitation having a stator including stator cores and windings respectively wound around the stator cores and supplied with current, and a mover arranged at a central portion of the stator, the mover including mover cores and permanent magnets. Each of the permanent magnets is arranged between adjacent ones of the mover cores. Each stator core has a pair of column portions spaced apart from each other by a desired distance. The windings are arranged in pairs such that each of the winding pairs has two windings wound around respective column portions of an associated one of the stator cores.

18 Claims, 8 Drawing Sheets

TRANSVERSE FLUX LINEAR MOTOR
WITH PERMANENT MAGNET EXCITATION

BACKGROUND OF THE INVENTION

1. Field of the Invention

The present invention relates to a high-power, high-efficient linear force generating system, and more particularly to a transverse flux linear motor with permanent magnet excitation, which can generate high force while having a relatively simple configuration, thereby achieving a high efficiency.

2. Description of the Related Art

Generally, linear force can be generated using hydraulic or pneumatic pressure, or a power transmission device such as a rotary motor and a ball screw. However, such systems have disadvantages of a complex configuration, high manufacturing costs, and high maintenance and repair expenses.

Meanwhile, conventional linear motors have a simple configuration in that they do not require any force transmission device because they directly generate a linear force. However, these linear motors have disadvantages of low thrust force and low efficiency. For instance, linear induction motors for railroad vehicles use a larger gap size than that of rotary induction motors by several times, and exhibit an end effect, so that they have low output power per unit weight, and have poor efficiency, as compared to rotary induction motors.

SUMMARY OF THE INVENTION

Therefore, the present invention has been made in view of the above described problems, and an object of the invention is to provide a transverse flux linear motor with permanent magnet excitation which has a simple configuration as compared to systems using hydraulic or pneumatic pressure, or a rotary motor and a power transmission device, while being capable of generating high force, thereby achieving a high efficiency, as compared to conventional linear motors.

In accordance with one aspect, the present invention provides a transverse flux linear motor with permanent magnet excitation comprising: a stator including at least one stator core, and at least one winding wound around the stator core and supplied with current; and a mover arranged at a central portion of the stator, the mover including mover cores and permanent magnets. Each of the permanent magnets is arranged between adjacent ones of the mover cores. The at least one stator core comprises a plurality of stator cores each having a pair of column portions spaced apart from each other by a pole pitch, and the at least one winding comprises a plurality of windings arranged in pairs, each of the winding pairs having two windings wound around respective column portions of an associated one of the stator cores.

The present invention provides a two-phase transverse flux linear motor with permanent magnet excitation comprising: a pair of single-phase transverse flux linear motor units with permanent magnet excitation each corresponding to the above described transverse flux linear motor, the linear motor units being arranged so that movers thereof face each other while being arranged at opposite sides of a non-magnetic element, respectively. The stators of the motor units are arranged to be shifted from each other by a distance corresponding to ½ of the pole pitch.

BRIEF DESCRIPTION OF THE DRAWINGS

The above objects, and other features and advantages of the present invention will become more apparent after a reading of the following detailed description when taken in conjunction with the drawings, in which.

DESCRIPTION OF THE PREFERRED EMBODIMENTS

Now, the single-phase configuration of a transverse flux linear motor with permanent magnet excitation according to a preferred embodiment of the present invention will be described in conjunction with FIGS. 1 to 7.

Figure 1:
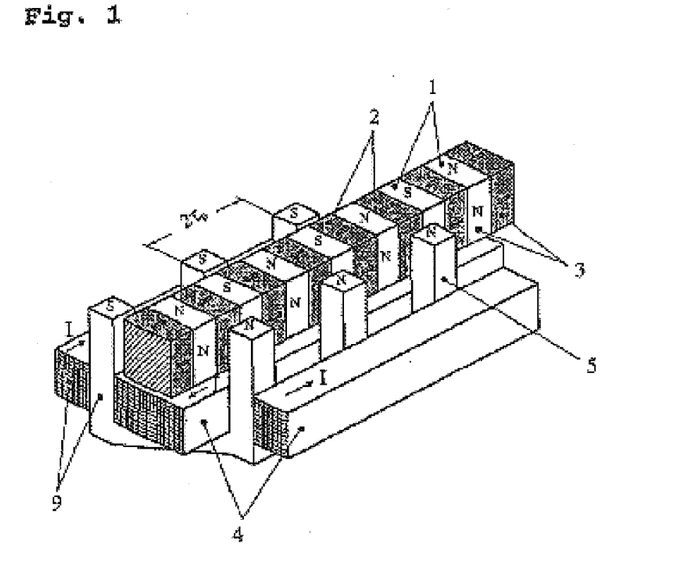
FIG. 1 is a view illustrating the basic configuration of the single-phase transverse flux linear motor with permanent magnet excitation according to the present invention.

FIG. 1 is a view illustrating the single-phase transverse flux linear motor with permanent magnet excitation. As shown in FIG. 1, the linear motor includes a mover 3 including a plurality of mover cores 1, and a plurality of permanent magnets 2 each arranged between adjacent ones of the mover cores 1. The mover 3 is arranged at the central portion of a stator 9. The stator 9 includes a plurality of stator cores 5, and windings 4 to flow the current.

Figure 2:
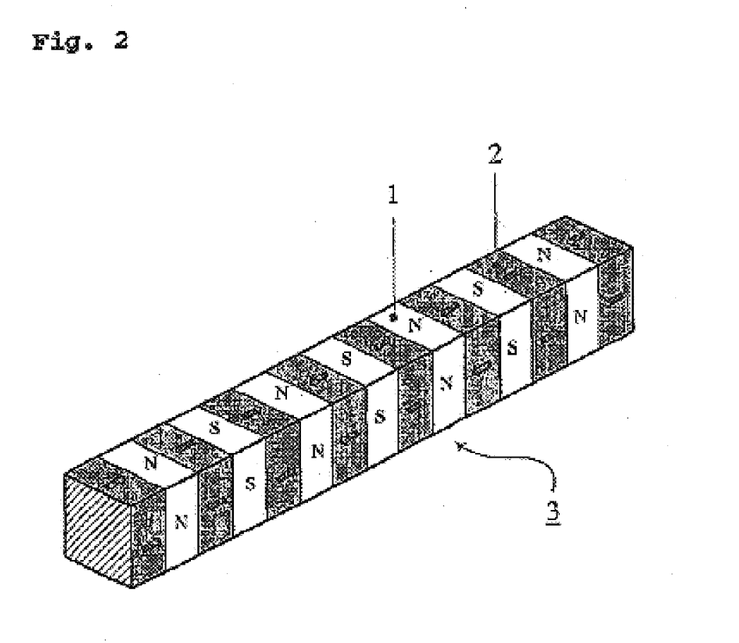
FIG. 2 is view illustrating the mover structure in the single-phase transverse flux linear motor with permanent magnet excitation.

As shown in FIG. 2, the mover 3 has a structure in which each permanent magnet 2 is interposed between adjacent ones of the mover cores 1 to form high magnetic flux in an air gap. The mover cores 1 and permanent magnets 2 have a square or rectangular shape. In FIG. 2, arrows indicate the direction of magnetic flux generated in the permanent magnets 2. Preferably, the mover cores 1 have the same dimensions. Also, the permanent magnets 2 preferably have the same dimensions. Neighboring ones of the permanent magnets 2 carrying one mover core 1 therebetween are arranged to generate magnetic fluxes in different directions, respectively.

Figure 3:
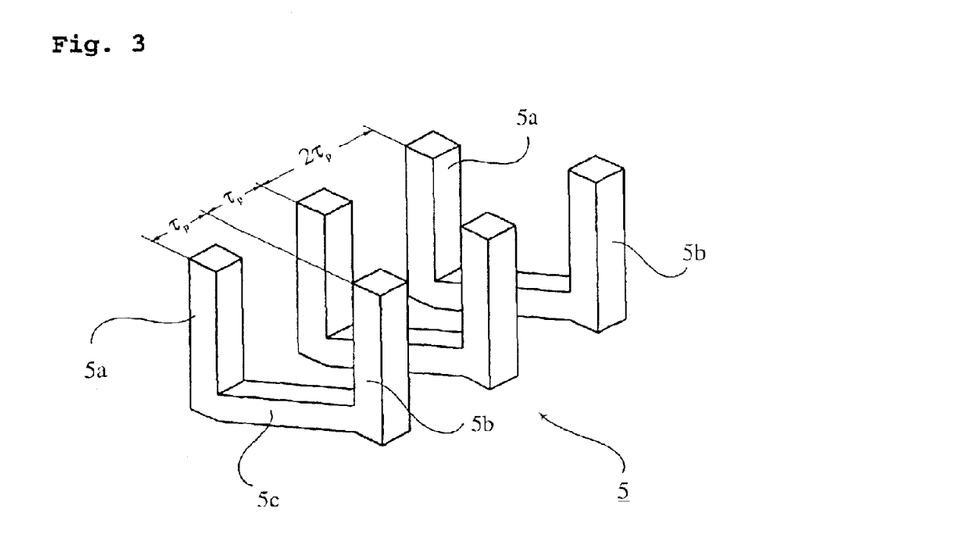
FIG. 3 is view illustrating the core structure in the single-phase transverse flux linear motor with permanent magnet excitation.

As shown in FIG. 3, each stator core 5 comprises a U-shaped core having a pair of column portions 5a and 5b and a base portion 5c. The stator cores 5 are arranged in such a fashion that they are skewed by a pole pitch of "•$_p$", so as to generate forces in the same direction in opposite air gaps by mover magnetic flux and stator magnetic flux. That is, the column portions 5a and 5b of each stator core 5 are skewed from each other by a pole pitch of "•$_p$". The stator cores 5 are arranged in parallel while having a spacing of "2•$_p$".

Figure 4:
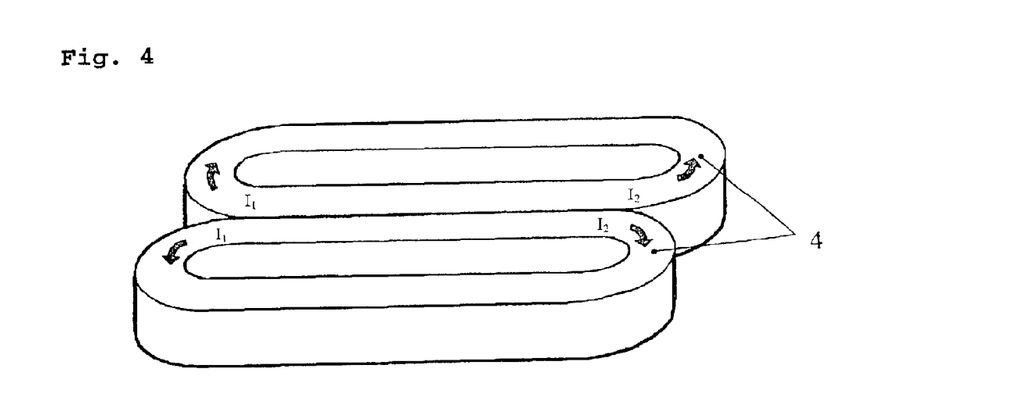
FIG. 4 is view illustrating the winding structure in the single-phase transverse flux linear motor with permanent magnet excitation.

As shown in FIG. 4, each winding 4 has an annular or cylindrical structure having a laterally-elongated inner space. The linear motor includes two windings 4 arranged in parallel in such a fashion that they are in contact with each other at facing outer surface portions thereof. As shown in FIG. 1, one-side column portions (for example, the column portions 5a in FIG. 3) of the stator cores 5 arranged in parallel are received in the inner space of one annular winding 4, whereas the other-side column portions (for example, the column portions 5b in FIG. 3) of the stator cores 5 arranged in parallel are received in the inner space of the other annular winding 4.

As the column portions 5a and 5b of the stator cores 5 are centrally received in respective annular windings, the contact portions of the two annular windings 4 are supported by the base portions 5c of the stator cores 5, as shown in FIG. 1. In this case, the mover 3 is arranged between the column portions 5a and 5b of the stator core 5 on the contact portions of the annular windings 4.

Now, the force generating principle of the transverse flux linear motor with permanent magnet excitation having the above-described configuration will be described in conjunction with FIGS. 5a and 5b.

Figures 5A, 5B:
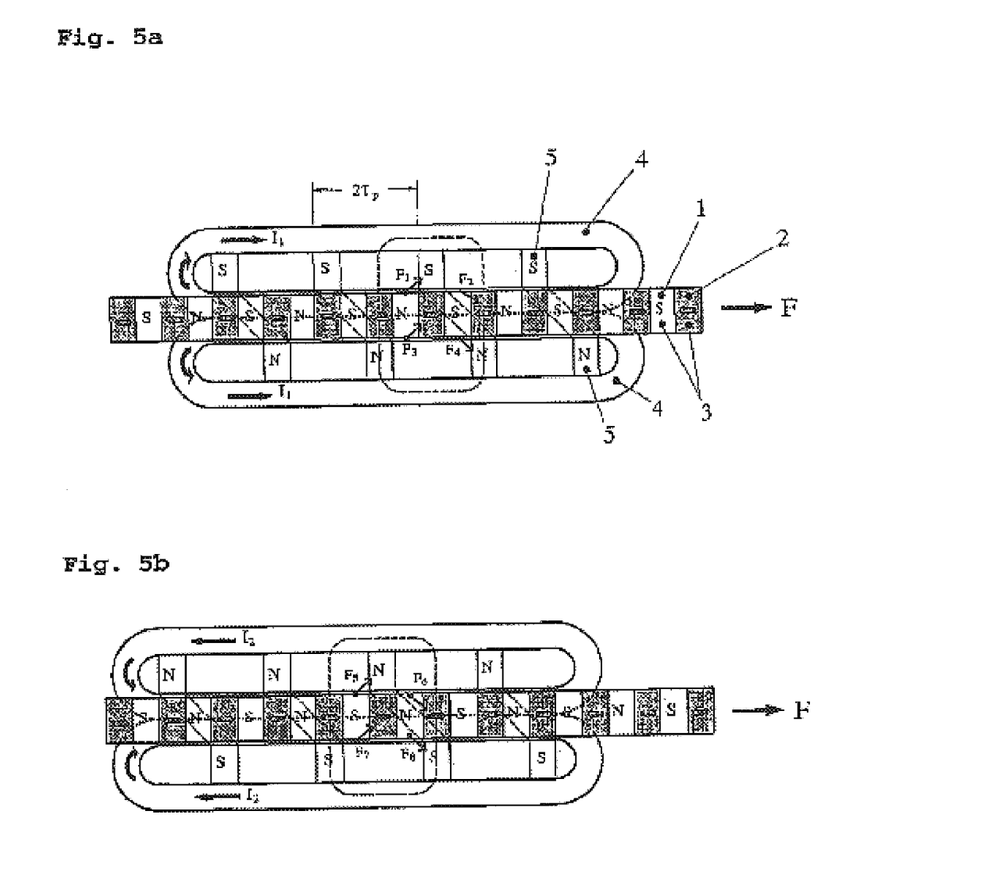
FIGS. 5a and 5b are views illustrating the force generating principle of the transverse flux linear motor with permanent magnet excitation.

When current flows in an $I_1$ direction through the stator windings 4, as shown in FIG. 5a, magnetic flux of an S-polarity are generated at the upper column portions of the stator cores 5, whereas magnetic flux of an N-polarity are generated at the lower column portions of the stator cores 5, in accordance with Ampere's circuital law. Accordingly, an attraction or repulsion force is generated in accordance with interactions between the poles of the stator and the poles of the mover. That is, an attraction force is generated when the poles of the stator and mover have the different direction, whereas a repulsion force is generated when the poles of the stator and mover have same directions. Thus, forces $F_1$, $F_2$, $F_3$, and $F_4$ are generated to form a total force F exerted in the right direction.

When the mover 3 is shifted by a distance corresponding to "•$_p$" from the state of FIG. 5a, and then current flows through the stator windings 4 in an $I_2$ direction, magnetic flux of the N polarity are generated at the upper column portions of the stator core 5, whereas magnetic flux of the S polarity are generated at the lower column portions of the stator core 5, as shown in FIG. 5b. Thus, forces $F_5$, $F_6$, $F_7$, and $F_8$ are generated to form a total force F exerted in the right direction.

Figure 6A:
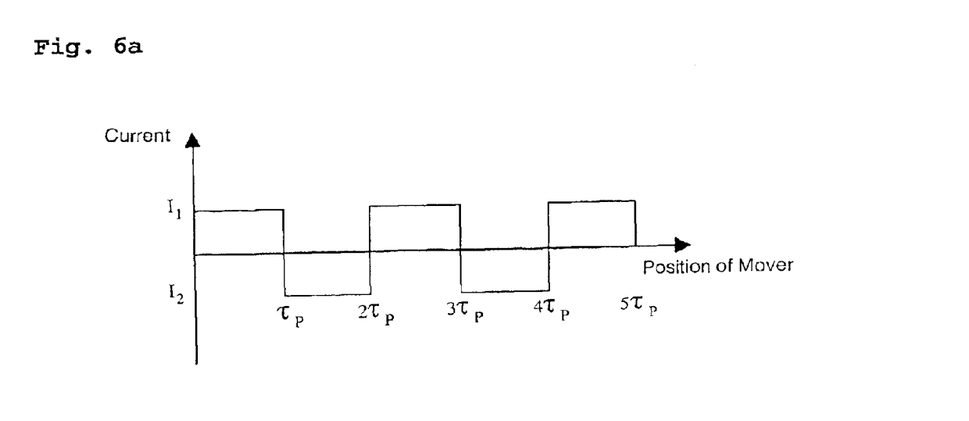
FIG. 6a is a characteristic diagram illustrating the current in accordance with the position of mover in the single-phase transverse flux linear motor with permanent magnet excitation.
Figure 6B:
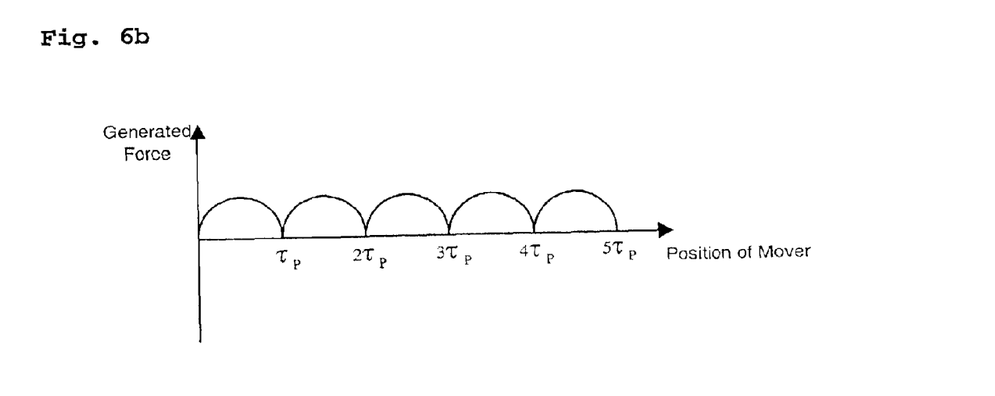
FIG. 6b is a characteristic diagram illustrating characteristics of force generated in accordance with the position of mover in the single-phase transverse flux linear motor with permanent magnet.

FIG. 6a is a diagram illustrating the current in accordance with the position of mover in the single-phase transverse flux linear motor with permanent magnet excitation. When current $I_1$ is applied in an interval from 0 to •$_p$, and current $I_2$ flowing in a direction opposite to that of the current $I_1$ is applied in an interval from •$_p$ to 2•$_p$, a thrust force is generated in accordance with the position of the mover, as shown in FIG. 6b.

Figure 7:
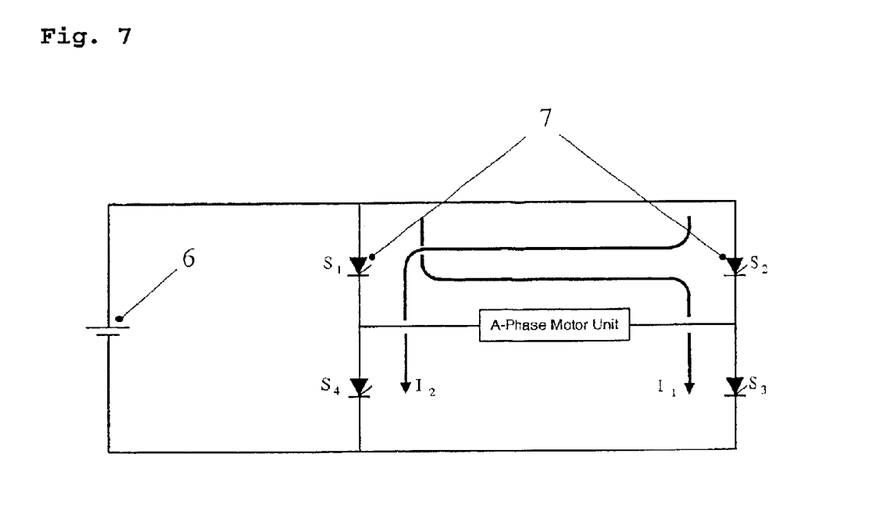
FIG. 7 is a circuit diagram illustrating a power supply circuit in the single-phase transverse flux linear motor with permanent magnet excitation.

FIG. 7 is a circuit diagram illustrating a power supply circuit in the single-phase transverse flux linear motor with permanent magnet excitation. In order to generate current flowing in the $I_1$ direction, elements $S_1$ and $S_3$ 7 are switched to their conductive state. On the other hand, elements $S_2$ and $S_4$ 7 are switched to their conductive state in order to generate current flowing in the $I_2$ direction. Semiconductor elements are used for the elements $S_1$ to $S_4$. Electrical power is supplied by power source 6.

Now, a two-phase transverse flux linear motor with permanent magnet excitation according to another embodiment of the present invention will be described in conjunction with FIGS. 8 to 11.

Figure 8:
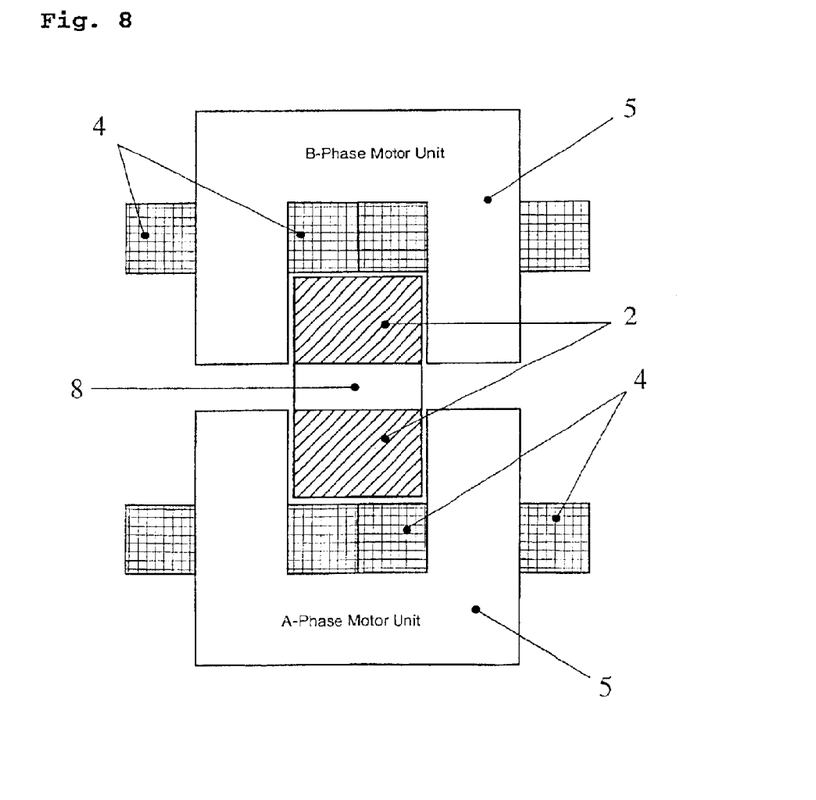
FIG. 8 is a view illustrating the basic configuration of a two-phase transverse flux linear motor with permanent magnet excitation according to the present invention.
Figure 9:
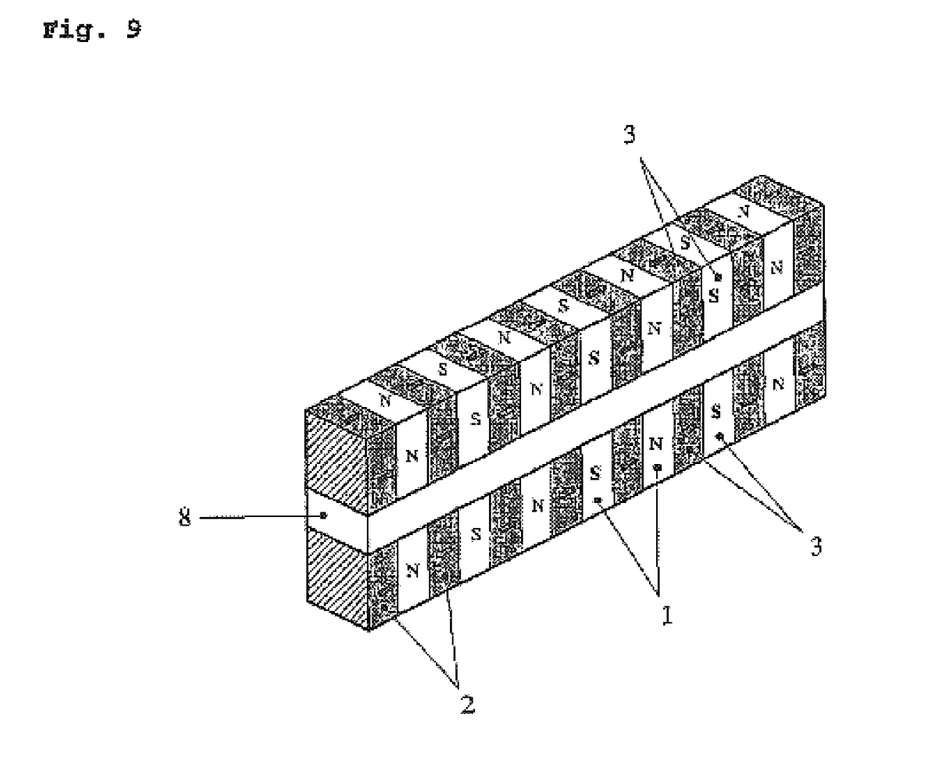
FIG. 9 is view illustrating a mover structure in the two-phase transverse flux linear motor with permanent magnet excitation.

FIG. 8 is a view illustrating a basic configuration of the two-phase transverse flux linear motor with permanent magnet excitation. As shown in FIG. 8, two-phase motor units, that is, an A-phase motor unit and a B-phase motor unit, are arranged to face each other. A non-magnetic element 8 for phase isolation is centrally arranged to prevent each of the A and B-phase motor units from being influenced by the magnetic circuit of the other. The stators of the A and B-phase motor units are arranged such that they are shifted from each other by "½ •$_p$", in order to reduce pulsations of thrust forces generated in the motor. FIG. 9 is a view illustrating movers of the two-phase transverse flux linear motor with permanent magnet excitation. FIG. 9 shows a configuration in which the phase isolation of non-magnetic element 8 is interposed between upper and lower movers 3.

Figure 10A:
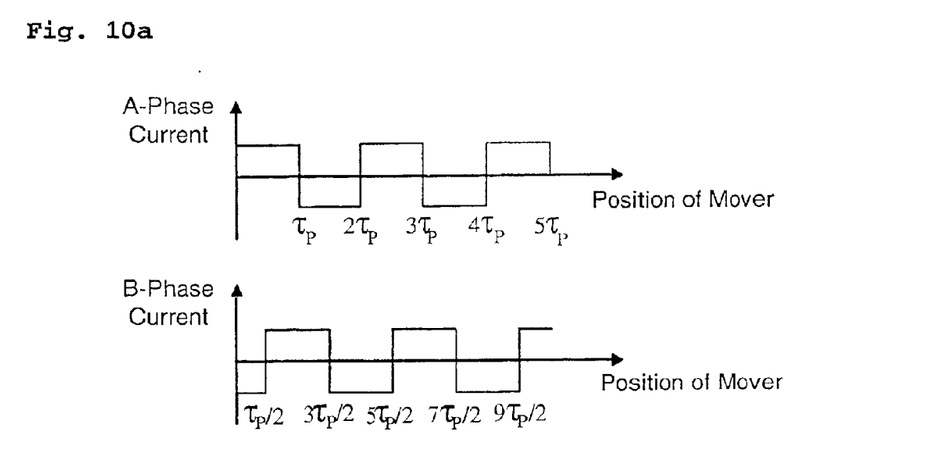
FIG. 10a is a diagram illustrating the current in accordance with the position of mover in each of A and B-phase motor units of the two-phase transverse flux linear motor with permanent magnet excitation.

FIG. 10a is a diagram illustrating the current in accordance with the position of mover in each of A and B-phase motor units of the two-phase transverse flux linear motor with permanent magnet excitation. As shown in FIG. 10a, the current waveform of the A-phase motor unit is shifted from the current waveform of the B-phase motor unit by "½•$_p$".

Figure 10B:
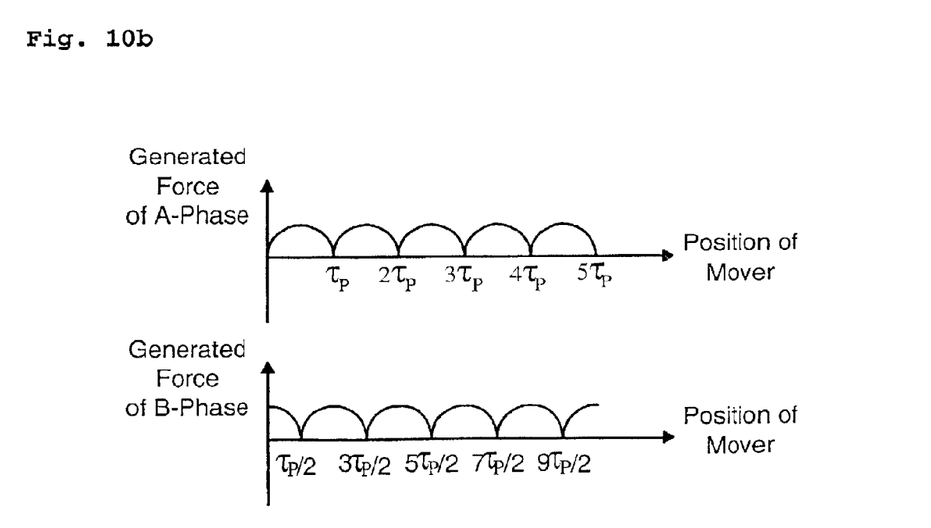
FIG. 10b is a diagram illustrating characteristics of force generated in accordance with the position of mover in each of the A and B-phase motor units of the two-phase transverse flux linear motor with permanent magnet excitation.

FIG. 10b is a diagram illustrating the characteristics of force generated in accordance with the position of mover in each of the A and B-phase motor units of the two-phase transverse flux linear motor with permanent magnet excitation. As shown in FIG. 10b, the force waveform of the A-phase motor unit is shifted from the force waveform of the B-phase motor unit by "½ •$_p$".

Figure 10C:
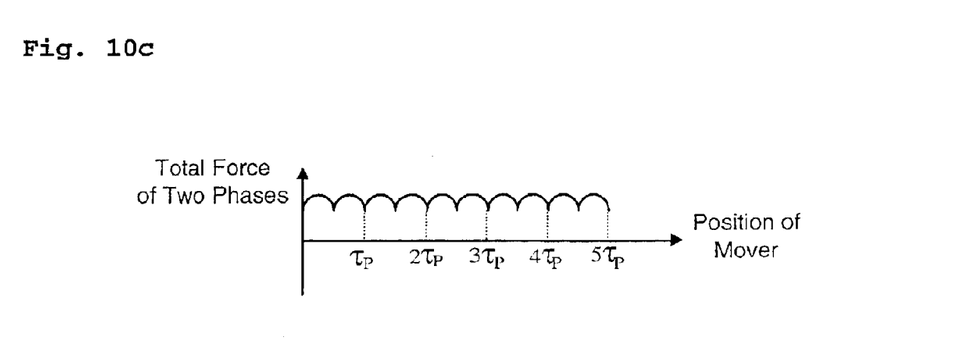
FIG. 10c is a diagram illustrating the characteristics of the total force of forces respectively generated in accordance with the position of mover in each of the A and B-phase motor units of the two-phase transverse flux linear motor with permanent magnet excitation.

FIG. 10c is a diagram illustrating the characteristics of the total force of forces respectively generated in accordance with the position of mover in each of the A and B-phase motor units of the two-phase transverse flux linear motor with permanent magnet excitation. The total force has a minimum value at positions of "0", "½•$_p$", "•$_p$", "3/2 •$_p$", "2•$_p$", ...

Figure 11:
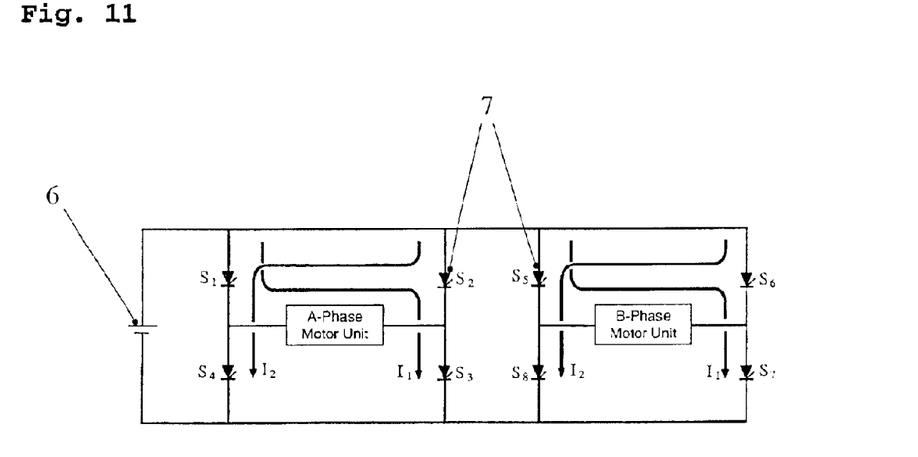
FIG. 11 is a circuit diagram illustrating a power supply circuit in the two-phase transverse flux linear motor with permanent magnet excitation.

FIG. 11 is a circuit diagram illustrating a power supply circuit in the two-phase transverse flux linear motor with permanent magnet excitation. In this case, the power supply circuit includes two power supply circuits, which are identical to that of FIG. 7 while using the power supply source 6 in common.

The two-phase transverse flux linear motor with permanent magnet excitation having the above-described configuration can obtain high no-load magnetic flux in air gaps using permanent magnets with a high energy density. It is also possible to generate a high thrust force because magnetic flux generated by permanent magnet and winding current are used. Where forces are generated at two-phase motor units, pulsations thereof are reduced. Since high power is obtained, it is possible to reduce the number of cores and the number of windings, thereby reducing the manufacturing costs while increasing the efficiency. Accordingly, the motor of the present invention can be installed at places where a high thrust force is required, or installation of a linear thrusting system is restricted. In particular, it is possible to substitute a large part of a system adapted to obtain power using hydraulic pressure, by a simple electrical thrusting system according to the present invention.

As apparent from the above description, the present invention provides a transverse flux linear motor with permanent magnet excitation which has a simple configuration as compared to systems using hydraulic or pneumatic pressure, a rotary motor or a power transmission device, thereby being capable of reducing the maintenance and repair expenses, while obtaining high power, thereby reducing the number of cores and the number of windings to reduce the manufacturing costs, and achieving in an enhancement in efficiency, thereby reducing the consumption of energy.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A transverse flux linear motor with permanent magnet excitation comprising:
    a stator including at least one stator core, and at least one winding wound around the stator core and supplied with current;
    a mover arranged at a central portion of the stator, the mover including mover cores and permanent magnets, each of said permanent magnets being arranged between adjacent ones of said mover cores; and
    said at least one stator core including a plurality of stator cores each having a pair of column portions spaced apart from each other by a predetermined distance, said at least one winding including a plurality of windings arranged in pairs, each of said winding pairs having two windings wound around respective column portions of an associated one of the stator cores.

2. The transverse flux linear motor with permanent magnet excitation according to claim 1, wherein adjacent ones of the permanent magnets arranged at opposite sides of each of the mover cores are adapted to generate magnetic fluxes in different directions, respectively.

3. The transverse flux linear motor with permanent magnet excitation according to 2, wherein the column portions of each of the stator cores are skewed from each other by a pole pitch, and the stator cores are arranged in parallel while having a spacing corresponding to two times the pole pitch.

4. The transverse flux linear motor with permanent magnet excitation according to claim 1, wherein the column portions of each of the stator cores are skewed from each other by a pole pitch, and the stator cores are arranged in parallel while having a spacing corresponding to two times the pole pitch.

5. The transverse flux linear motor with permanent magnet excitation according to claim 4, wherein the current flows through the windings while changing in direction whenever the mover is shifted in position by a distance corresponding to the pole pitch.

6. A transverse flux linear motor with permanent magnet excitation comprising:
    a stator including U-shaped stator cores arranged in parallel while being spaced apart from one another by a predetermined distance, each of the stator cores having a pair of column portions, and a plurality of windings arranged in pairs, each of the winding pairs having two windings wound around respective column portions of an associated one of the stator cores; and
    a mover having a rod shape while including permanent magnets and mover cores arranged in an alternating fashion, the mover extending on the windings between the column portions of the stator cores in the same direction as the arrangement direction of the stator cores.

7. The transverse flux linear motor with permanent magnet excitation according to claim 6, wherein each of the permanent magnets is arranged between adjacent ones of the mover cores.

8. The transverse flux linear motor with permanent magnet excitation according to claim 7, wherein adjacent ones of the permanent magnets arranged at opposite sides of each of the mover cores are adapted to generate magnetic flux in different directions, respectively.

9. The transverse flux linear motor with permanent magnet excitation according to claim 8, wherein the column portions of each of the stator cores are skewed from each other by a pole pitch, and the stator cores are arranged in parallel while having spacing corresponding to two times the pole pitch.

10. The transverse flux linear motor with permanent magnet excitation according to claim 7, wherein the stator cores arranged in parallel have a pitch corresponding to the sum of a total length of two mover cores and a total length of two permanent magnets.

11. The transverse flux linear motor with permanent magnet excitation according to claim 7, wherein the column portions of each of the stator cores are skewed from each other by a pole pitch, and the stator cores are arranged in parallel while having a spacing corresponding to two times the pole pitch.

12. The transverse flux linear motor with permanent magnet excitation according to claim 6, wherein the column portions of each of the stator cores are skewed from each other by a pole pitch, and the stator cores are arranged in parallel while having a spacing corresponding to two times the pole pitch.

13. A two-phase transverse flux linear motor with permanent magnet excitation comprising:
    a pair of single-phase transverse flux linear motor units with permanent magnet excitation, each of said linear motor units including,
    a stator including at least one stator core, and at least one winding wound around the stator core and supplied with current;
    a mover arranged at a central portion of the stator, the mover including mover cores and permanent magnets, each of said permanent magnets being arranged between adjacent ones of said mover cores; and
    said at least one stator core including a plurality of stator cores each having a pair of column portions spaced apart from each other by a predetermined distance, said at least one winding including a plurality of windings arranged in pairs, each of said winding pairs having two windings wound around respective column portions of an associated one of the stator cores;

the linear motor units being arranged so that movers thereof face each other while being arranged at opposite sides of a non-magnetic element, respectively.

14. The two-phase transverse flux linear motor with permanent magnet excitation according to claim 13, wherein the stators of the motor units are arranged to be shifted from each other by a distance corresponding to one half of the pole pitch.

15. The two-phase transverse flux linear motor with permanent magnet excitation according to claim 14, wherein the non-magnetic element serves to isolate phases of the motor units from each other while integrating the movers of the motor units.

16. The two-phase transverse flux linear motor with permanent magnet excitation according to claim 15, wherein the current flows through the windings while changing in direction whenever the movers are shifted in position by a distance corresponding to the pole pitch, and the currents respectively flowing through the motor units have a direction changing timing difference corresponding to one half of the pole pitch.

17. A transverse flux linear motor with permanent magnet excitation comprising:

a stator including a plurality of stator cores with windings wound around said stator cores and supplied with current, said stator cores being arranged in parallel and having column portions that are skewed from each other; and a mover arranged at a central portion of the stator, the mover including mover cores and permanent magnets, each of said permanent magnets being arranged between adjacent ones of said mover cores.

18. The transverse flux linear motor with permanent magnet excitation according to claim 17, wherein the column portions of each of the stator cores are skewed from each other by a pole pitch, and the spacing of the stator cores corresponds to two times the pole pitch.

* * * * *